Patented Aug. 30, 1927.

1,640,708

UNITED STATES PATENT OFFICE.

NAPOLEON ARTHUR LAURY, OF ROCKVILLE CENTER, NEW YORK.

METHOD OF PRODUCING ZINC CARBONATE.

No Drawing.   Application filed December 23, 1925.   Serial No. 77,285.

My invention relates to methods for producing pure zinc compounds from impure materials containing zinc.

The primary object of my invention is to provide a method whereby zinc compounds of high purity may be produced efficiently and inexpensively.

This application is a continuation in part of my pending application Serial No. 934, filed January 6, 1925.

Zinc may be recovered from its ores by furnacing the ore to convert the zinc to the oxide form and then leaching with ammonium chloride or sulphate and then precipitating as a carbonate by means of ammonium or sodium or other carbonate.

I have found that this precipitation is practically complete if the solution of zinc in the ammonium salt is saturated with carbon dioxide under pressure, or in lieu of pressure, sufficient carbon dioxide may be held in solution to effect practically complete precipitation of the zinc if the solution is kept cooled to substantially 40° F. or lower.

Carbon dioxide from calcined carbonates may be used or even cleaned flue gas, so that more expensive reagents, as mentioned, are avoided.

To illustrate the preferred method of conducting this process I heat a roasted zinc ore to about 180° F. with a 20% solution of ammonium sulphate until 4 parts of ZnO have been dissolved by each hundred parts of the solution; I then separate the clear solution by settling and saturate it with $CO_2$ at a pressure of about 20 lbs. in a closed vessel; I then separate the solution from the precipitated carbonate and return it to the leaching tank. The carbonate after washing may be used as such or it may be converted to other pure zinc compounds by driving off the $CO_2$ with heat or with acid in which cases the evolved gas can be used for subsequent carbonations.

The terms and expressions which I have employed are used as terms of description and not of limitation, and I have no intention, in the use of such terms and expressions of excluding any equivalents of the features described, or portions thereof, but recognize that various modifications are possible within the scope of the invention claimed.

What I claim is:

1. A method for the precipitation of an insoluble zinc compound which consists in cooling an aqueous solution of ammonium sulphate containing zinc in solution and treating the solution with carbon dioxide.

2. A method for the precipitation of an insoluble zinc compound which consists in treating an aqueous solution of ammonium sulphate containing zinc in solution with carbon dioxide under pressure.

3. A method for producing carbonate of zinc which consists in treating an aqueous solution of ammonium sulphate containing zinc in solution with a carbon dioxide at a temperature not higher than 40° F.

4. A method for producing carbonate of zinc which consists in heating roasted zinc ore to substantially 180° F. in a 20 per cent aqueous solution of ammonium sulphate, then in separating out the clear solution, and then in saturating the clear solution with carbon dioxide at a pressure of substantially twenty pounds.

NAPOLEON ARTHUR LAURY.